United States Patent
Roy et al.

(10) Patent No.: US 10,556,545 B2
(45) Date of Patent: Feb. 11, 2020

(54) OVER-CAB RACK FOR TRAFFIC DELINEATORS

(71) Applicant: ROYAL TRUCK & EQUIPMENT, INC., Coopersburg, PA (US)

(72) Inventors: Robert H Roy, Emmaus, PA (US); Andrew C Washburn, Coopersburg, PA (US); Joseph T Piggott, Easton, PA (US); Siddharth Balasubramanian, Bethlehem, PA (US)

( * ) Notice: Subject to any disclaimer, the term of this patent is extended or adjusted under 35 U.S.C. 154(b) by 0 days.

(21) Appl. No.: 16/132,376

(22) Filed: Sep. 15, 2018

(65) Prior Publication Data

US 2019/0031111 A1    Jan. 31, 2019

Related U.S. Application Data

(63) Continuation-in-part of application No. 15/913,562, filed on Mar. 6, 2018, now Pat. No. 10,319,227, which is a continuation-in-part of application No. 15/197,685, filed on Jun. 29, 2016, now abandoned.

(60) Provisional application No. 62/638,818, filed on Mar. 5, 2018, provisional application No. 62/631,840, filed on Feb. 18, 2018, provisional application No. 62/186,036, filed on Jun. 29, 2015.

(51) Int. Cl.
*B60R 9/048* (2006.01)
*E01F 9/70* (2016.01)
*E01F 9/688* (2016.01)

(52) U.S. Cl.
CPC ............... *B60R 9/048* (2013.01); *E01F 9/70* (2016.02); *E01F 9/688* (2016.02)

(58) Field of Classification Search
CPC .. E01F 9/70; E01F 9/692; B60R 11/06; B60R 1/002; B60R 9/048; G09F 27/005; G08G 1/09; G08G 1/054; B60P 1/38; B60P 1/50
See application file for complete search history.

(56) References Cited

U.S. PATENT DOCUMENTS

| | | | |
|---|---|---|---|
| 3,157,267 A | 11/1964 | Asbury | E01H 1/14 198/310 |
| 3,232,408 A | 2/1966 | Asbury | E01F 9/70 198/617 |
| 3,709,178 A * | 1/1973 | Piker | B63B 35/732 114/61.33 |
| D229,784 S | 1/1974 | Carter | D29/2 |
| 3,952,690 A | 4/1976 | Rizzo et al. | E01F 9/01 116/63 |
| D243,073 S | 1/1977 | Kulp et al. | D10/6 |

(Continued)

*Primary Examiner* — Hoi C Lau
(74) *Attorney, Agent, or Firm* — David A. Burge (57) ABSTRACT

A rack structure is provided for supporting an elongate, generally horizontally extending nested stack of substantially identically configured barrel-like traffic delineators at a location atop a cab of a truck, with the nested stack of traffic delineators being laid on one of its sides so the stack extends generally forwardly-rearwardly, with a relatively smaller front end region of the nested stack situated forwardly of a relatively larger rear end region of the nested stack. The rack structure has a forwardly-rearwardly-movable component configured to perimetrically surround and support a portion of the relatively smaller front end region of the stack, and a forwardly-rearwardly extending fixed component that underlies and supports a portion of the relatively larger rear end region of the stack.

11 Claims, 8 Drawing Sheets

(56) References Cited

U.S. PATENT DOCUMENTS

| | | | | |
|---|---|---|---|---|
| D243,075 S | 1/1977 | Kulp et al. | | D10/6 |
| 4,083,033 A | 4/1978 | Kulp et al. | | E01F 9/00 340/114 |
| 4,219,141 A * | 8/1980 | Lovy | | E01F 9/70 116/28 R |
| 4,319,778 A | 3/1982 | Leonard et al. | | B60P 3/34 296/166 |
| 4,597,706 A * | 7/1986 | Michit | | E01F 9/688 414/788.2 |
| 4,642,007 A | 2/1987 | Marshall et al. | | B62D 23/00 410/78 |
| 4,674,431 A | 6/1987 | Cory | | G08B 23/00 116/63 |
| 4,710,053 A | 12/1987 | Kulp et al. | | E01F 9/00 404/9 |
| 4,747,515 A | 5/1988 | Kasher et al. | | B65G 59/06 221/116 |
| 4,873,190 A | 10/1989 | Saito et al. | | E01F 9/00 404/10 |
| 5,054,648 A | 10/1991 | Luoma | | B65G 65/18 221/185 |
| 5,080,541 A * | 1/1992 | Andre | | B60P 3/08 410/24.1 |
| 5,201,599 A | 4/1993 | Kulp et al. | | E01F 13/00 404/6 |
| 5,208,585 A | 5/1993 | Sprague | | E01F 15/086 116/63 |
| 5,209,540 A | 5/1993 | Metler | | B60P 3/42 296/3 |
| 5,213,464 A | 5/1993 | Nicholson et al. | | B65G 59/06 414/440 |
| 5,234,280 A | 8/1993 | Cowan | | E01F 9/00 404/6 |
| 5,244,334 A * | 9/1993 | Akita | | E01F 9/70 414/502 |
| 5,435,662 A * | 7/1995 | Brown | | E01C 23/06 116/63 C |
| 5,476,301 A | 12/1995 | Berkich | | B60P 3/00 296/3 |
| 5,525,021 A * | 6/1996 | Larguier | | E01F 9/70 414/551 |
| 5,846,045 A | 12/1998 | Johnson et al. | | B60R 9/00 414/462 |
| 5,868,520 A | 2/1999 | Kulp et al. | | E01F 13/00 404/6 |
| 5,905,434 A | 5/1999 | Steffan | | B60Q 1/50 116/28 |
| 6,019,542 A | 2/2000 | Bent et al. | | E01F 13/02 404/6 |
| 6,056,498 A * | 5/2000 | Velinsky | | E01F 9/70 414/501 |
| 6,158,948 A * | 12/2000 | Calvert | | B60P 1/38 116/63 C |
| 6,413,033 B1 * | 7/2002 | Monroig, Jr. | | B60P 3/122 414/462 |
| 6,435,369 B1 * | 8/2002 | Poursayadi | | E01F 9/70 221/185 |
| D466,269 S | 11/2002 | Falland | | D34/39 |
| 6,478,505 B1 | 11/2002 | Kulp et al. | | E01F 15/00 404/6 |
| D481,965 S | 11/2003 | Feit et al. | | D10/113 |
| D486,089 S | 2/2004 | Mettler et al. | | D10/109 |
| D487,365 S | 3/2004 | Bourne | | D6/462 |
| 6,726,434 B2 * | 4/2004 | Orthaus | | E01F 9/70 414/435 |
| 6,752,582 B2 * | 6/2004 | Garcia | | E01F 9/688 116/63 C |
| 6,786,673 B2 | 9/2004 | Kulp et al. | | E01F 15/00 404/6 |
| 6,971,329 B1 * | 12/2005 | Stewart | | E01F 13/028 116/63 C |
| 7,101,143 B2 * | 9/2006 | Orthaus | | E01F 9/70 414/551 |
| D541,555 S | 5/2007 | Falland | | D6/621 |
| 7,431,532 B2 * | 10/2008 | Lidster | | E01F 9/70 404/6 |
| 7,581,918 B2 * | 9/2009 | Jordan | | E01F 9/70 198/315 |
| D628,353 S | 11/2010 | Garton et al. | | D34/38 |
| D628,354 S | 11/2010 | Garton et al. | | D34/38 |
| D628,355 S | 11/2010 | Spann et al. | | D34/38 |
| D646,044 S | 9/2011 | Garton et al. | | D34/38 |
| 8,500,360 B1 * | 8/2013 | Jones | | E01F 9/70 256/13.1 |
| 8,794,172 B2 | 8/2014 | Bromm et al. | | E01F 9/012 116/63 |
| 9,056,572 B2 * | 6/2015 | Hemphill | | B60P 1/02 |
| 9,489,841 B1 | 11/2016 | Huggins | | G08G 1/056 |
| 10,112,528 B1 | 10/2018 | Mazuir | | B60Q 1/444 |
| 10,272,861 B2 | 4/2019 | Wymore | | B60R 19/48 |
| 10,319,227 B2 * | 6/2019 | Roy | | G09F 27/005 |
| 2003/0147733 A1 * | 8/2003 | Shimomato | | E01F 9/70 414/501 |
| 2004/0057822 A1 * | 3/2004 | Orthaus | | E01F 9/70 414/539 |
| 2005/0074143 A1 * | 4/2005 | Kawai | | B60D 1/36 382/104 |
| 2005/0095105 A1 * | 5/2005 | Parks | | E01F 9/70 414/540 |
| 2005/0199640 A1 * | 9/2005 | Clark | | E01F 9/688 221/1 |
| 2006/0012487 A1 | 1/2006 | Gibson | | G08B 5/006 340/815.45 |
| 2006/0147264 A1 * | 7/2006 | Doran, Jr. | | E01F 9/70 404/73 |
| 2007/0071584 A1 * | 3/2007 | Beckstead | | E01F 9/70 414/467 |
| 2007/0183874 A1 | 8/2007 | Garcia | | B60P 1/00 414/437 |
| 2009/0097914 A1 * | 4/2009 | Flynn | | E01F 9/70 404/9 |
| 2009/0166998 A1 | 7/2009 | Groeneweg | | E01F 15/148 280/408 |
| 2009/0256697 A1 | 10/2009 | Tallinger | | B60Q 1/2611 340/472 |
| 2011/0163517 A1 | 7/2011 | Groeneweg | | B60P 3/00 280/423.1 |
| 2013/0064632 A1 * | 3/2013 | Pawluk | | B60P 3/08 414/482 |
| 2013/0156532 A1 * | 6/2013 | Hemphill | | B60P 1/02 414/495 |
| 2014/0111323 A1 | 4/2014 | Strout | | B60Q 2/268 340/425.5 |
| 2014/0200759 A1 * | 7/2014 | Lu | | B60D 1/245 701/28 |
| 2015/0225913 A1 | 8/2015 | Groeneweg | | E01F 15/148 212/299 |
| 2016/0333537 A1 * | 11/2016 | Julien | | E01F 9/70 |
| 2016/0379492 A1 | 12/2016 | Roy | | G08G 1/09 340/907 |
| 2017/0246988 A1 | 8/2017 | Ihedinmah | | B60Q 1/503 |
| 2017/0287233 A1 | 10/2017 | Nix | | G07C 5/008 |
| 2018/0001817 A1 | 1/2018 | Adams | | B60Q 1/2611 |
| 2018/0121742 A1 * | 5/2018 | Son | | G06T 7/74 |
| 2018/0125030 A1 * | 5/2018 | Glover | | A01K 5/0225 |
| 2018/0194352 A1 | 7/2018 | Avedisov | | B60W 30/16 |
| 2018/0195246 A1 * | 7/2018 | Hanssen | | E01F 9/70 |
| 2018/0261088 A1 * | 9/2018 | Roy | | G09F 27/005 |
| 2019/0031111 A1 * | 1/2019 | Roy | | B60R 9/048 |
| 2019/0048543 A1 * | 2/2019 | Roy | | E01F 9/70 |
| 2019/0241126 A1 * | 8/2019 | Murad | | B60R 1/12 |
| 2019/0308547 A1 * | 10/2019 | Sousa Vazquez | | B61D 3/18 |
| 2019/0330811 A1 * | 10/2019 | Roy | | B60R 1/002 |

\* cited by examiner

OVER-CAB RACK FOR TRAFFIC DELINEATORS

REFERENCE TO RELATED APPLICATIONS

This utility application claims the benefit of the filing date of Provisional Application Ser. No. 62/631,840 filed Feb. 18, 2018 by the inventors hereof, entitled TRUCK MOUNTABLE OVER-CAB RACK FOR TRANSPORTING NESTED STACKS OF BARREL-TYPE TRAFFIC DELINEATORS, the disclosure of which is incorporated herein, in its entirety, by reference.

This utility application also claims the benefit of the filing date of Provisional Application Ser. No. 62/638,818 filed Mar. 5, 2018 by the inventors hereof, entitled TRUCK MODULE FOR ASSISTING WORKMEN TO PLACE AND RETRIEVE TRAFFIC DELINEATORS ALONGSIDE HIGHWAY WORK SITES, the disclosure of which is also incorporated herein, in its entirety, by reference.

This utility application also is a continuation-in-part of Utility application Ser. No. 15/913,562 filed Mar. 6, 2018 by the inventors hereof, entitled ROADWAY WORK AREA SAFETY TRUCK, the disclosure of which also is incorporated herein, in its entirety, by reference.

Reference also is made to utility application Ser. No. 15/197,685 filed Jun. 29, 2016 by Robert H. Roy entitled ALL IN ONE SAFETY DISPLAY, from which utility application Ser. No. 15/913,562 was filed as a continuation-in-part, the disclosure of which also is incorporated herein, in its entirety, by reference.

BACKGROUND

So-called "traffic delineators" (also known as "traffic delineation safety markers") are well known that are positioned alongside highway work zones to define lines of demarcation that separate the work zones from highway lanes where traffic is maintained while construction and repair work is underway inside the work zones.

Most traffic delineators in present-day use are formed from relatively lightweight plastic materials that have hollow, upstanding configurations that taper so as to narrow as they extend upwardly, thereby permitting identically configured traffic delineators to be nested one atop another to form nested stacks.

One common configuration of present-day traffic delineator takes the form of such hollow barrel-like members as are disclosed in the group of seventeen patents that follow—namely U.S. Pat. Nos. 8,794,172, 6,786,673, 6,478,505, 6,019,542, 5,868,520, 5,234,280, 5,201,599, 4,973,190, 4,710,053, 4,674,431, 4,083,033, 3,952,690, D-486,089, D-481,965, D-243,075, D-243,073 and D-229,784, the disclosures of which patents are incorporated herein in their entireties, by reference.

The barrel-like traffic delineators disclosed in the group of seventeen patents listed just above have closed, relatively smaller diameter upper end regions, with sidewalls that generally taper and/or are of stepped diameter as they depend to form relatively larger diameter, open bottom end regions that permit identical ones of the barrel-like delineators to be stacked one atop another to form vertically nested stacks that often are transported atop the beds of commercially available flat bed trucks.

The referenced utility application Ser. No. 14/913,562 discloses a complete so-called "crash truck" that has a flat bed atop which workers can ride while collecting barrel-like traffic delineators. The crash truck is designed to facilitate the lowering of barrel-like delineators from the flat bed to one or more workers who occupy so-called "man baskets" alongside the flat bed of the crash truck for receiving barrel-like delineators from workers atop the flat bed of the crash truck, and for positioning the delineators at spaced intervals alongside a roadway work zone to divert and guide traffic alongside the work zone while or prior to when roadway repair and/or construction work is conducted within the work zone.

When work within the work zone is completed, the crash truck is again driven alongside the work zone so that traffic delineators that have been residing at spaced at intervals alongside the work zone can be retrieved as the crash truck moves alongside the work zone. Workers riding atop the flat bed of the crash truck collect the barrel-like delineators as a worker or workers in one or more "man baskets" raise and collect the barrel-like delineators from alongside the work zone.

The present invention provides an over-cab rack structure (and assemblies of the over-cab rack structure) that are designed to receive, store and transport one or more generally horizontally extending nested stacks of substantially identically configured barrel-like traffic delineators, with the stack or stacks extending generally forwardly-rearwardly atop the cab of an associated truck.

The over-cab rack structures of the present invention address and alleviate the problem of too many traffic delineators being collected and assembled in nested stacks atop the flat bed of a crash truck after being removed from alongside a roadway work zone. If too many traffic delineators collect atop the flat beds crash trucks, vertically nested stacks of the delineators tend to shift about the flat beds, with at least some of the stacks tending to overturn. Attempting to limit the movement of these nested stacks by the use of ropes, cables and chains can cause personnel to trip, stumble and fall as these restraining devices and the stacks of nested traffic delineators become loosened and also move about the flat beds of the trucks.

An alternative to supporting vertically extending nested stacks of traffic delineators atop the flat beds of trucks is shown in FIG. 1 of U.S. Pat. No. 4,219,141, wherein a frame 12 is shown supporting a horizontally extending nested stack of traffic cones atop the bed of a pickup truck 10. The frame 12 is hung from a horizontally extending member 46 that overlies the bed of the pickup truck 10, and can be moved horizontally along the horizontally extending member 16 as a horizontally extending nested stack of traffic cones increases in length as more and more traffic cones are sequentially added to the nested stack. The disclosure of U.S. Pat. No. 4,219,141 is incorporated herein, in its entirety, by reference.

SUMMARY OF THE INVENTION

The present invention relates to elongate rack structures that are well suited to extend substantially horizontally in a forwardly-rearwardly-extending manner over the top of the cabs of flat-bed trucks for receiving, storing and transporting horizontally-extending nested stacks of substantially identically configured barrel-like traffic delineators such as are disclosed, for example, in the group of seventeen patents previously referenced.

The over-cab rack structures disclosed herein are well suited to overlie the cab of a flat bed truck (such as the so-called "crash truck" that is disclosed in referenced utility application Ser. No. 15/913,562) as the truck is driven alongside a roadway work zone while personnel transported by the truck place traffic delineators alongside a roadway work zone, or retrieve traffic delineators from alongside a roadway work zone.

The horizontally extending nested stacks of barrel-like traffic delineators carried by the over-cab rack structures of the present invention are each laid on one of their sides so each stack extends generally forwardly-rearwardly with respect to the cab of an associated truck, with a relatively smaller front end region of each nested stack being situated forwardly of a relatively larger rear end region of each nested stack.

Each rack structure embodying a preferred practice of the present invention has a forwardly-rearwardly-movable component configured to perimetrically surround and support a portion of the relatively smaller forward end region of an associated nested stack of barrel-like traffic delineators, and a forwardly-rearwardly extending fixed component that underlies and supports a portion of the relatively larger rearward end region of the associated nested stack of barrel-like traffic delineators.

A rack structure that embodies the preferred practice of the present invention has a front or first support component (that is movable along the length of the rack structure) for receiving and supporting a relatively smaller front end region of a horizontally extending nested stack of barrel-like traffic delineators, and a rear or second support component (that does not need to move) for underlying and supporting a relatively larger rear end region of the nested stack. A flexible member (such as a rope or cable) is preferably connected to the front or first support component to permit the front or first support component to be pulled along the length of the rack structure.

The front or first support component mentioned just above can be a hoop-like member that can receive and perimetrically surround at least a portion of the relatively smaller front end region of the nested stack. The rear or second support component mentioned just above can take the form of a pair of spaced, substantially parallel-extending tubular rails that are positioned to underlie and support at least a portion of the relatively larger rear end region of the nested stack.

If a rack structure assembly embodying the present invention is capable of carrying more than one substantially horizontally-extending nested stack of barrel-like traffic delineators, the nested stacks are preferably carried in a substantially side-by-side manner by the rack structure.

DETAILED DESCRIPTION

Referring to FIGS. 1 through 4, a conventional, commercially available flat bed truck is indicated generally by the reference numeral 100. The truck has a conventional cab 110 with the usual access doors 120 on opposite sides thereof, and has a conventional flat bed 130 extending rearwardly from the cab 110 for hauling various forms of cargo (not shown).

Figure 1:
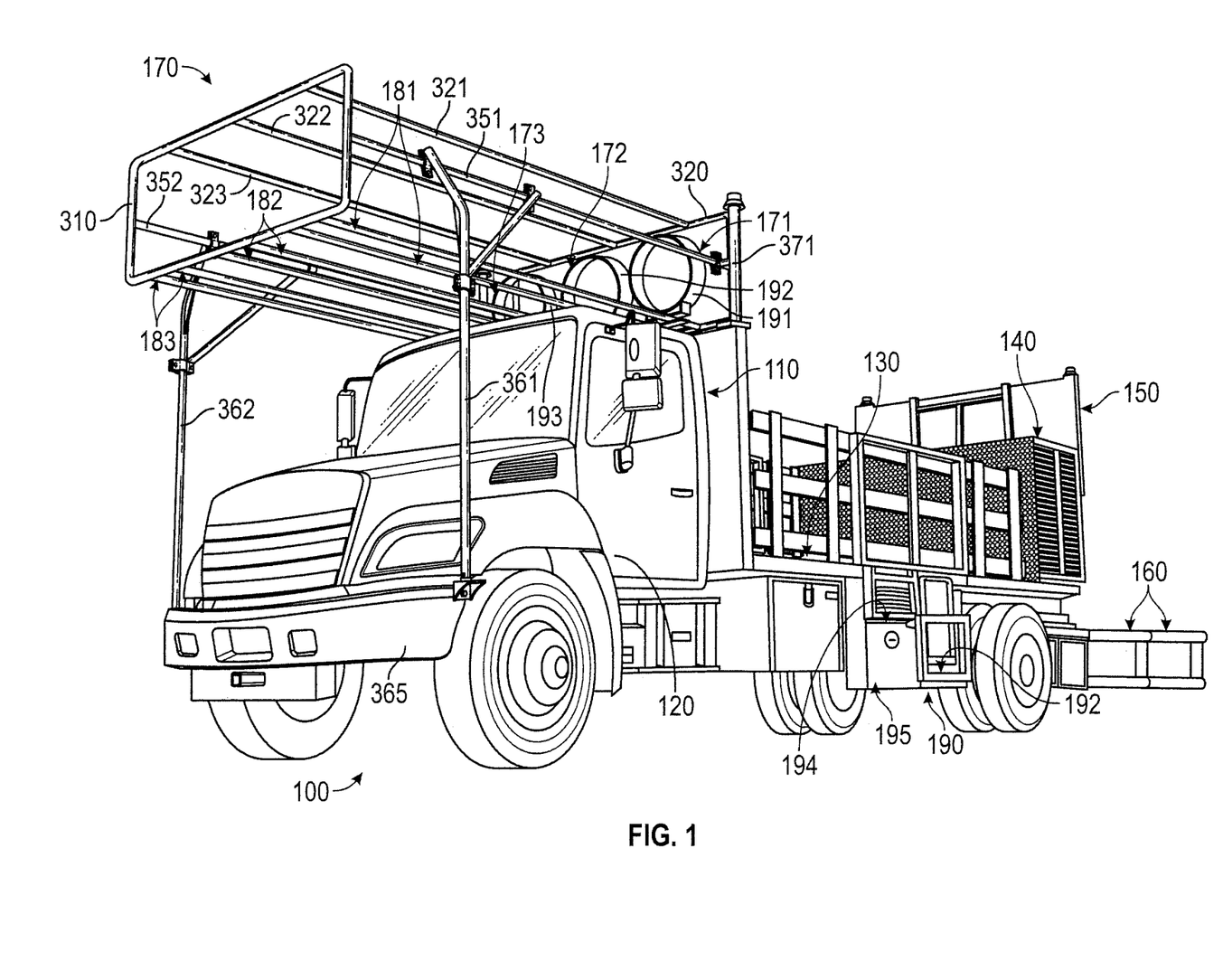
FIG. 1 is a perspective view showing the left side (i.e., the driver's side) of a conventional, commercially available, flat bed truck provided with an over-cab rack structure assembly embodying a preferred practice of the present invention which is capable of receiving, storing and transporting a plurality of horizontally extending stacks of substantially identical barrel-like traffic delineators, with the nested stacks arranged side-by-side, with the view also showing a commercially available crash attenuator device connected to and extending rearwardly from the flat bed truck, and with a rearwardly-facing electronic warning sign board shown in a raised position at the rear of the flat bed of the truck.
Figure 2:
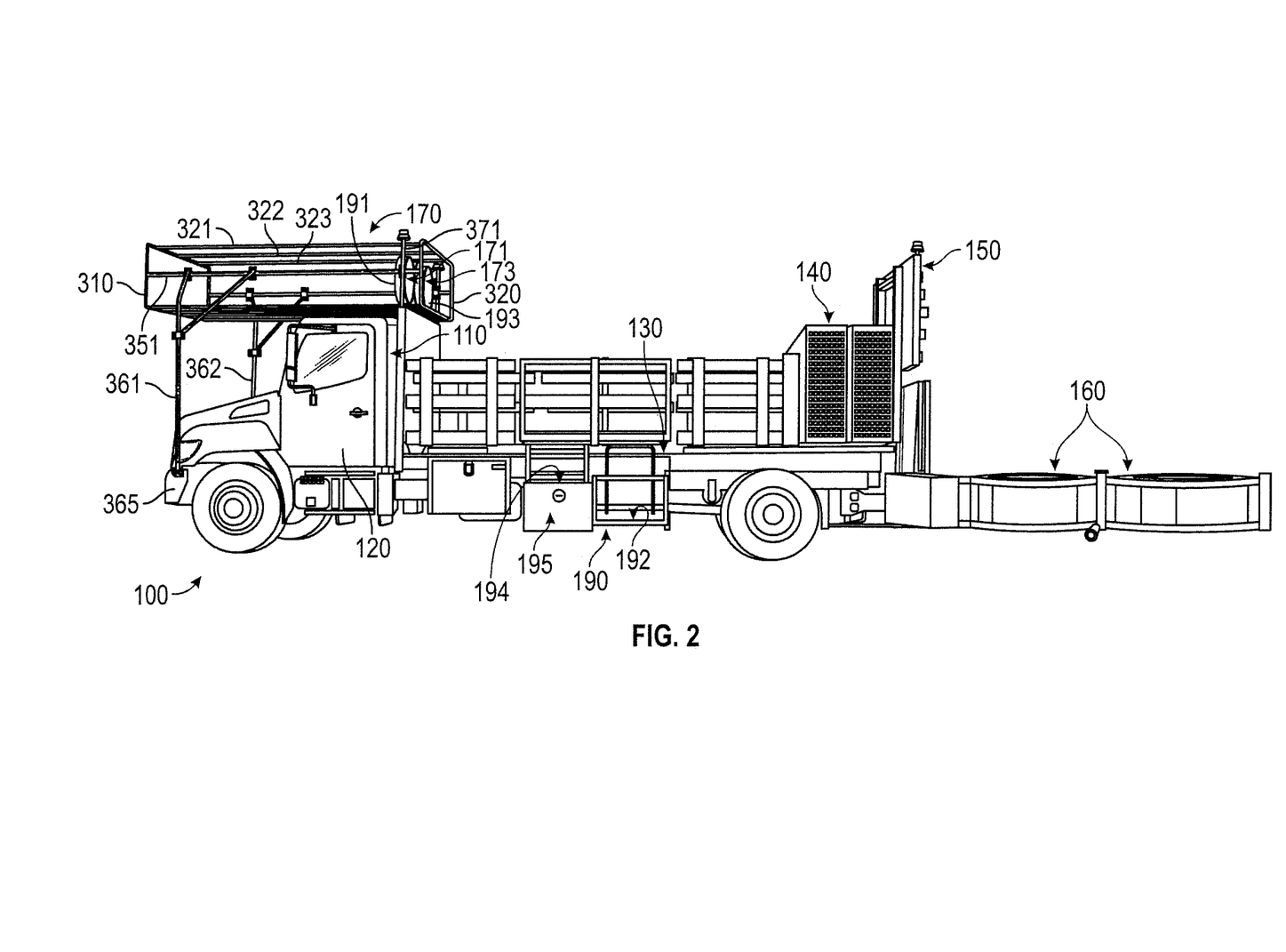
FIG. 2 is a side elevational view of the left side of the flat bed truck and its over-cab rack structure assembly shown in FIG. 1.
Figure 3:
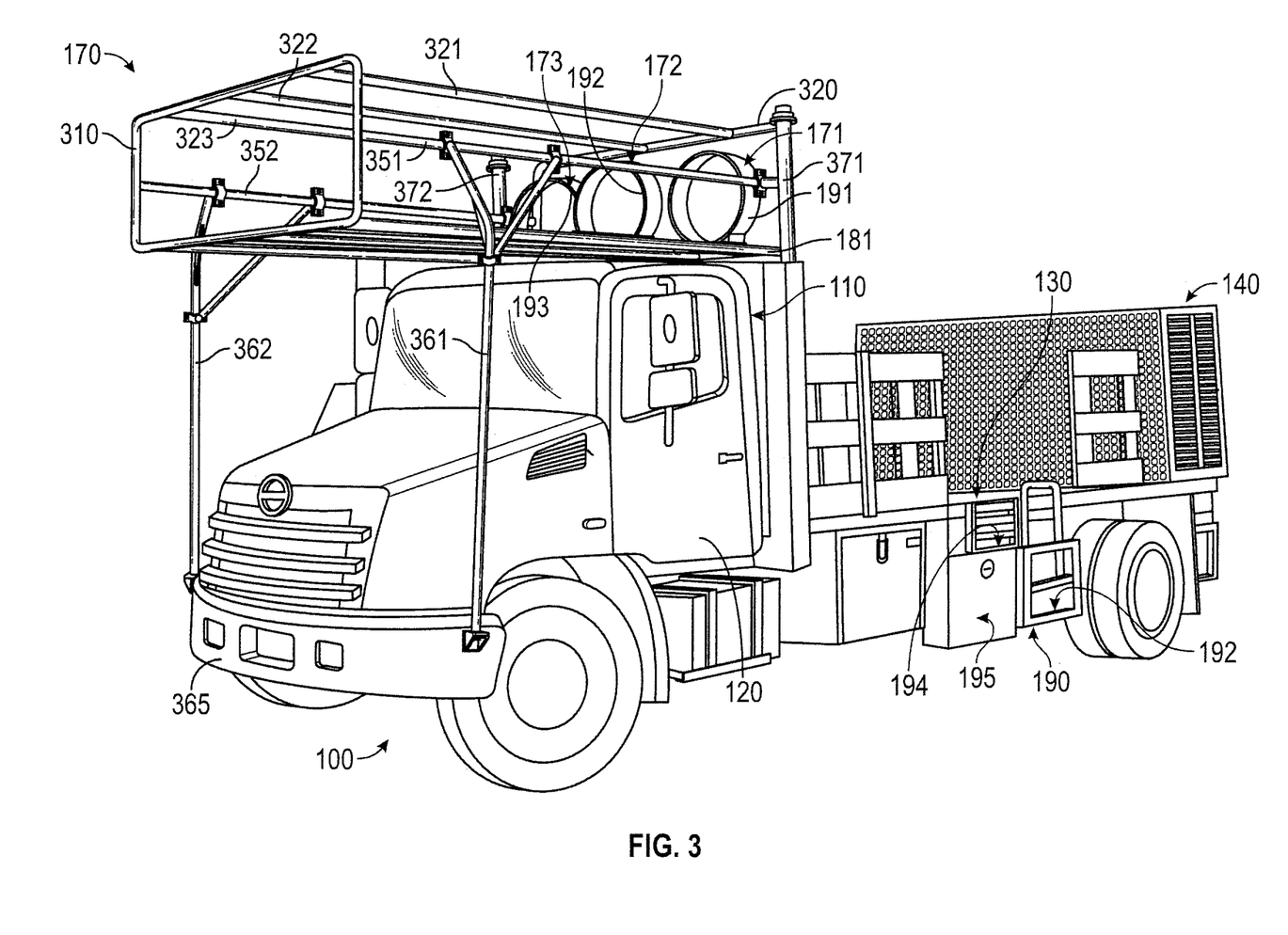
FIG. 3 is another perspective view of the left side of the flat bed truck and the over-cab rack structure assembly that are shown in FIGS. 1 and 2, with the crash attenuator device and the electronic warning sign board removed from the flat bed truck.
Figure 4:
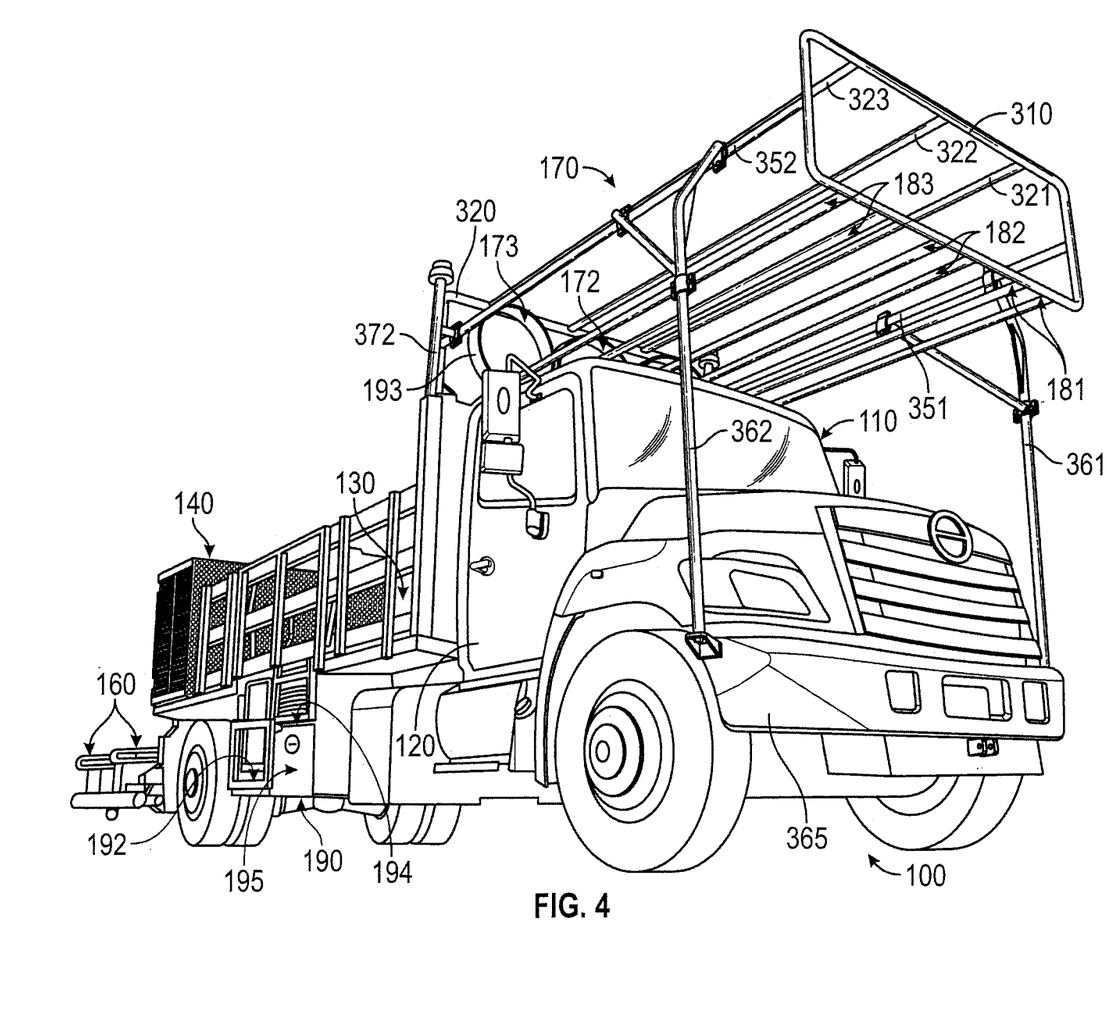
FIG. 4 is perspective view of the right side of the flat bed truck, with the electronic warning sign board lowered to an out-of-view position.

An optional storage compartment 140 is shown at the rear of the flat bed 130. An optional, rearwardly facing, electronic sign board 150 is shown at the rear of the flat bed 130 of the truck 100. In FIGS. 1 and 2 the sign board 150 is shown in an elevated position. In FIGS. 3 and 4 the electronic sign board 150 cannot be seen because it either has been removed from the truck 100, or has been lowered to an out-of-view storage position.

An optional, commercially available crash attenuator unit 160 extends rearwardly from the rear of the truck 100. When the sign board 150 is lowered to the out-of-view storage position mentioned above, the electronic sign board 150 is out of the path of the crash attenuator unit 160 when the crash attenuator unit 160 pivots upwardly and folds forwardly to a transport position (not shown in the drawings of this application) where a portion of the crash attenuator unit 160 overlies the storage compartment 140 as well as a rear portion of the flat bed 130 of the truck 100.

One embodiment of the crash attenuator 160 is depicted in greater detail in FIG. 1 of U.S. Pat. No. 9,399,845. How components of the crash attenuator 160 can pivot upwardly and fold forwardly to the transport position mentioned above is shown in FIGS. 1A-1B of U.S. Pat. No. 8,322,945. The disclosures of U.S. Pat. Nos. 9,399,845 and 5,322,945 are incorporated herein, in their entireties, by reference.

At a location near to and just forward of the rearmost tires and wheels of the truck 100 is a "safety module 190" that (as is disclosed in the above-referenced utility application Ser. No. 15/913,562) is provided as a safe place for a workman to stand who is putting down, and picking up, barrel-like traffic delineators. A left side embodiment of the safety module 190 is shown in FIGS. 1-3, and right side embodiment of the safety module 190 is shown in FIG. 4.

The mirror-reversal left and right side safety modules 190 each have two horizontally-extending levels, namely a lower "stand-on" level 192 located quite near the tires of the rear axle, and an upper "delineator placement" level 194 that overlies a tool box 195. How the left and right side modules 190 are used to support a workman, and how the modules 190 are used to assist the placement and retrieval of barrel-like traffic delineation safety markers is disclosed in the previously referenced provisional application 62/638,818, the disclosure of which is incorporated herein by reference.

In FIGS. 1 through 5, a rack structure assembly 170 is shown of three substantially identical over-cab rack structures 171, 172, 173 that each embody the preferred practice of the present invention. The rack structure assembly 170 includes three pairs of parallel-extending, elongate rails 181, 182, 183, with the pairs of rails 181, 182, 183 each movably supporting one of three identically configured hoop assemblies 191, 192, 193, respectively. The hoop assemblies 191, 192, 193 each slide along one of the associated pairs of the rails 181, 182, 183 of the rack structures 171, 172, 173, respectively.

The rack structure assembly 170 is rendered structurally sound by virtue of the pairs of rails 181, 182, 183 having their opposite front and rear end regions welded to substantially identically configured front and rear generally rectangular structures 310, 320, respectively. The rack structure assembly 170 is strengthened by three elongate tubular members 321, 322, 323 that also have their opposite front and rear end regions welded to the generally rectangular front and rear structures 310, 320, respectively.

The elongate tubular members 321, 322, 323 each overlie one of the individual rack assemblies 171, 172, 173, respectively, and help to retain such nested stacks of barrel-like traffic delineators 1000 as are carried by the rack structures 171, 172, 173. Portions of examples of barrel-like traffic delineators 1000 as may form nested stacks of barrel-like traffic delineators 1000 are shown (by example) in FIG. 7, in place on a typical one of the rack structures 171.

Figure 6:
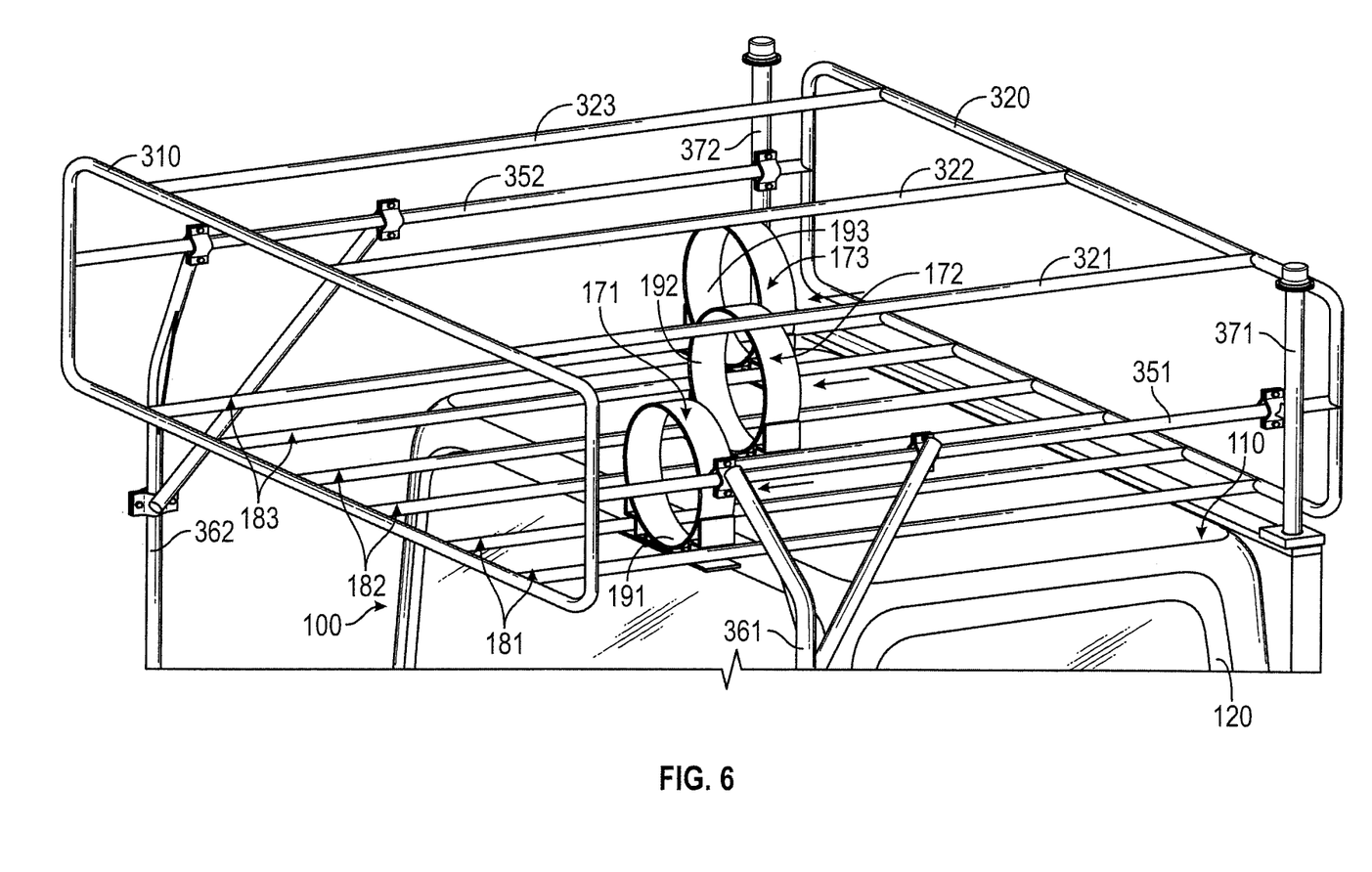
FIG. 6 is a perspective view, on an enlarged scale, of the over-cab rack structure assembly that can be seen to have three substantially identical, side-by-side rack structures that each is well suited to receive and transport a single horizontally extending nested stack of barrel-like traffic delineation safety markers (such as are shown in FIG. 7)

To support the rack structure assembly 170 atop the cab 110 of the truck 100, the rack structure assembly 170 is, provided with two forwardly-rearwardly extending tubular members 351, 352 that can best be seen in FIG. 6. The tubular member 351 extends between the front and rear generally rectangular structures 310, 320 above the left side of the truck 100. The tubular member 352 extends between the front and rear rectangular structures 310, 320 above the right side of the truck 100.

Referring to FIGS. 1 through 5, left and right upwardly extending supports 361, 362 connect with a front bumper 365 of the truck 100, and with the left and right tubular members 351, 352, respectively. As is best shown in FIG. 6, left and right upwardly extending supports 371, 372 also connect with the left and right tubular members 351, 352, respectively. By this arrangement, the rack structure assembly 170 is securely fastened to the truck 100 to overlie the cab 110 of the truck 100.

Figure 5:
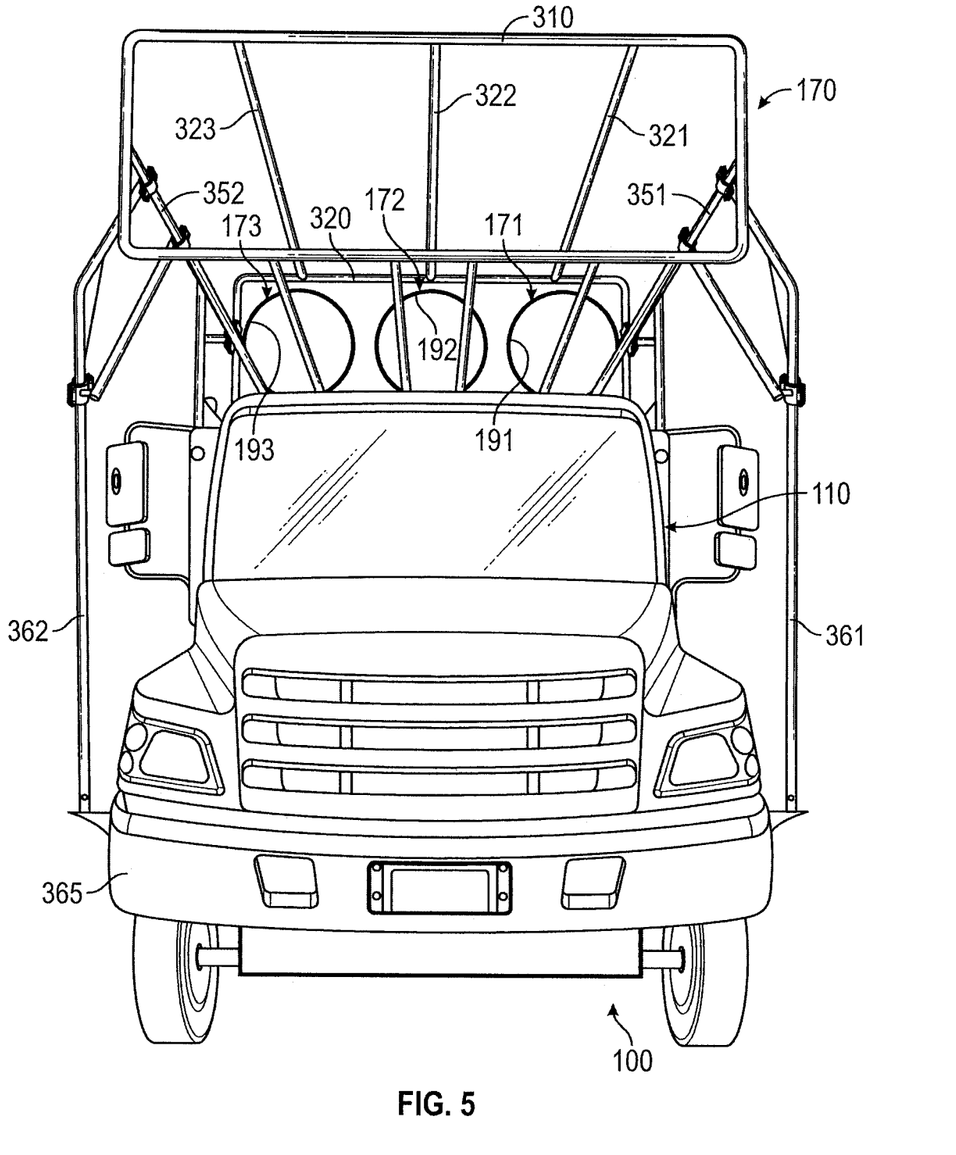
FIG. 5 is a front view of the flat bed truck and its over-cab rack structure assembly.
Figure 7:
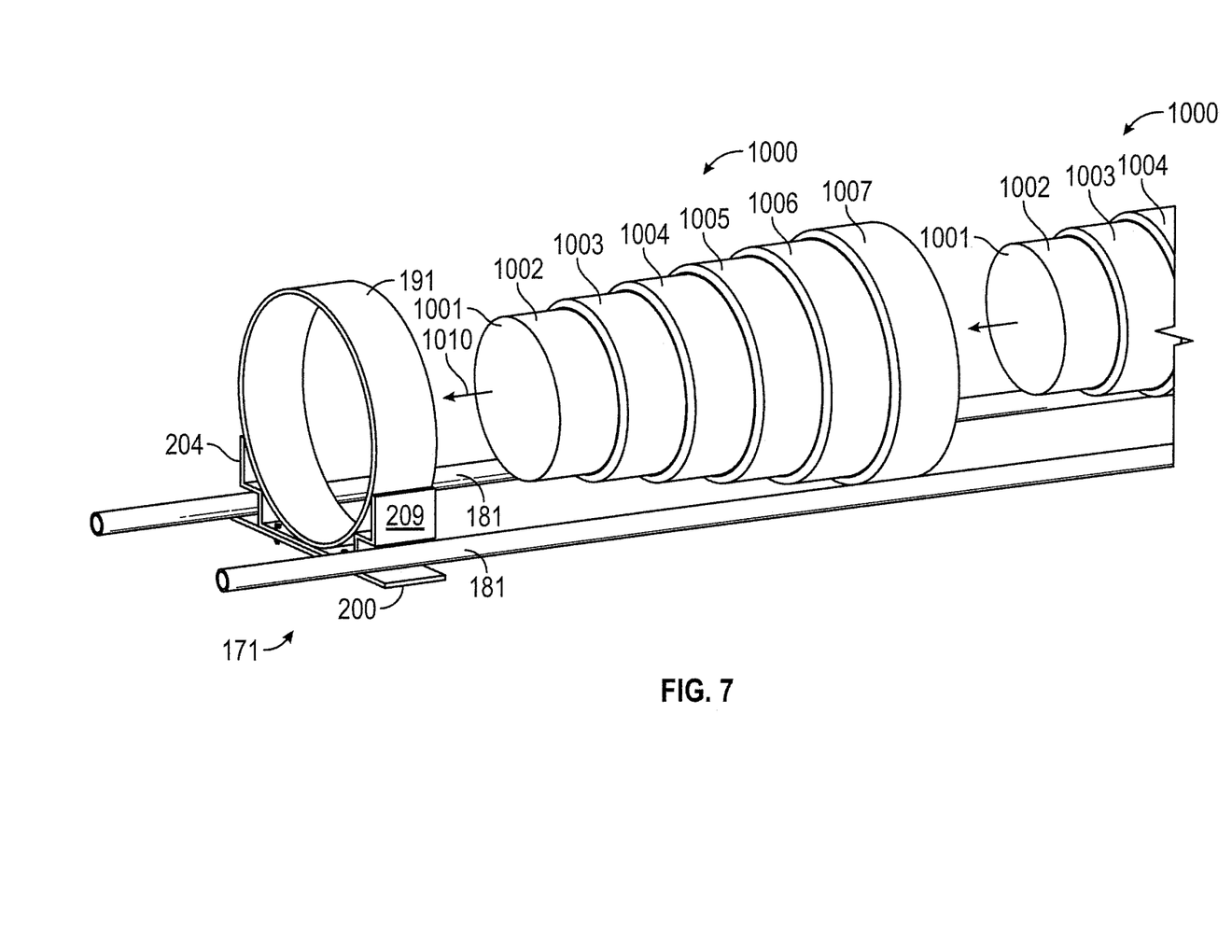
FIG. 7 is a perspective view, on an enlarged scale, of one of the three substantially identical, side-by-side rack structure assemblies, with typical barrel-like traffic delineators for forming a horizontally extending nested stack such as can be carried on one of the rack structures of the present invention; and, FIG. 8 is a front view, on an enlarged scale, of a portion of one of the identical rack structures of the present invention.

Depicted in FIG. 7 is a selected one of the substantially identically configured rack structures 171, 172, 173 (namely the rack structure 171) that includes one of the hoop assemblies 191, 192, 193 that are best shown in FIGS. 3, 5 and 6. The hoop assemblies 191, 192, 193 can best be seen in FIG. 6 to be connected to and movably supported by an associated one of the elongate pairs of parallel-extending rails 181, 182, 183, respectively.

The rails 181, 182, 183 of each of the rack structures 171, 172, 173 are spaced apart by equal distances that are selected to suitably support at least portions of the relatively larger rear end regions of the nested stacks of barrel-like delineators 1000 that are carried on each of the rack assemblies 171, 172, 173. The front view of FIG. 8 shows the rack assembly 171, with the associated rails 181 being depicted as tubular members that slidably support the associated hoop assembly 191.

Figure 8:
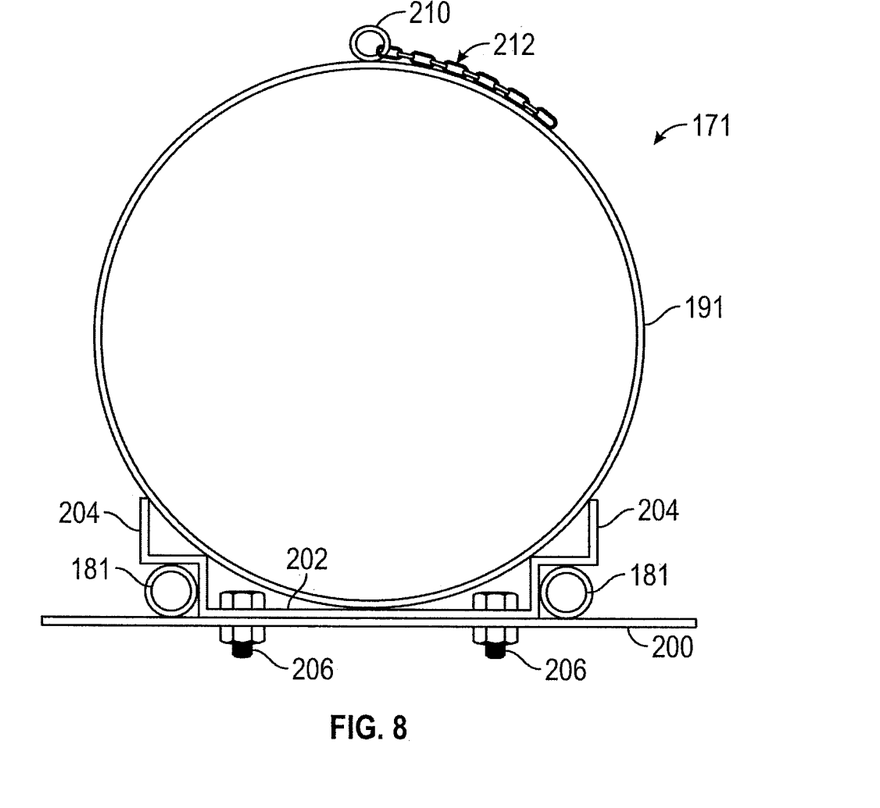

As can be seen in FIG. 8, the typical hoop assembly 191 includes a flat underlying member 200, and a overlying member 202 that has upwardly folded opposed end regions 204 that underlie and support the associated annular hoop 191. Threaded fasteners 206 rigidly connect the members 200, 202 so the hoop assembly 191 can slide along the lengths of the associated pair of tubular rails 181. Similarly, the hoop assemblies 192, 193 can slide along the lengths of the pairs of the associated tubular rails 182, 183, respectively.

Referring again to FIG. 8, a link 210 is welded or otherwise affixed to the hoop 191 (or to some other suitable portion of the hoop assembly 191), and a flexible rope, chain, or cable 212 is attached to the link 210 so the hoop assembly 191 can be pulled along the rails 181. In a similar fashion other links (not shown) are attached to the hoop assemblies 192, 193, so that other flexible ropes, chains or cables (not shown) can be attached to the other links (not shown) to permit the hoop assemblies 192, 193 to be pulled along the rails 182, 183, respectively, to facilitate unloading of horizontally extending stacks of the barrel-like traffic delineators 1000 from the rack assemblies 171, 172, 173, respectively.

FIG. 7 shows how a plurality of barrel-type traffic safety delineators 1000 are supported atop the rack assembly 171. Each of the delineators 1000 has a closed, relatively smaller front end region 1001, and stepped sidewalls that define a plurality of diameters 1002, 1003, 1004, 1005, 1006 and 1007, with the diameter 1007 defining an open rear end region (not shown) that provides access to the hollow interior of each of the barrel-like traffic delineators 1000.

To load barrel-like delineators 1000 onto the rack 171 (and, likewise, to load delineators 1000 onto each of the racks 172, 173), a first of the delineators 1000 is pushed forwardly (as indicated by an arrow 1010 in FIG. 7) until a relatively small diameter 1002 one the first of the delineators 1000 is received by the hoop 191, whereafter the next-to-be-loaded delineator 1000 is pushed forwardly (as indicated by an arrow 1020) until a next-being-loaded delineator 1000 is received reasonably snugly (and is therefore nested within) the interior of the previously loaded delineator 1000, and so on, until the rack structure 171 is filled with a nested stack of the barrel-like traffic delineators 1000.

To unload barrel-like delineators 1000 from the rack structure 171 (and, likewise, from the rack structures 172, 173), the rope, chain or flexible cable 212 that is attached to the hoop 191 or some other portion of the rack structure 171 is pulled rearwardly to move the hoop 191 rearwardly so the barrel-like delineators 1000 that form a horizontally extending stack carried by the rack structure 171 can be grasped and unloaded one at a time by personnel (not shown) standing on the flat bed 130 of the truck 100.

A significant feature of the over-cab rack assembly 170 is that it makes use of the otherwise unused over-cab space to store and transport barrel-like traffic delineators 1000 so the flat bed 130 of the truck 100 is thereby permitted to be used to carry other cargo. An advantage of rack structures 171, 172, 173 that embody the preferred practice of the present invention is that the rack structures 171, 172, 173 permit the barrel-like traffic delineators 1000 to be added one-at-a-time to, and dispensed one-at-a-time from, each of the relatively larger rear end regions of the nested stacks carried by the rack structures 171, 172, 173, by personnel who may be standing atop a flat bed of a truck that is being driven alongside a border of a roadway work zone.

As those who are skilled in the art will readily appreciate, the over-cab rack structures 171, 172, 173 (and the rack structure assembly 170) that are disclosed herein can be modified to receive, store, transport and dispense traffic delineators of other configurations than the barrel-like delineators 1000 for which the present rack structure assembly 170 (and the rack structures 171, 172, 173) are primarily designed to accommodate.

The hoop-like front support components 191, 192, 193 need not be annular in shape, but can take a variety of configurations as may be needed to receive, perimetrically surround and support the relatively smaller front end regions of the nested stacks of the barrel-like traffic delineators 1000 (or of such barrel-like traffic delineators as are disclosed in the group of seventeen previously referenced patents) as may need to be received, stored and transported by the rack structures 171, 172, 173, respectively.

Likewise, the pairs of parallel-extending support rails 181, 182, 183 can be spaced apart as may best provide support to the relatively larger rear portions of the nested stacks of barrel-like traffic delineators 1000 (or of such barrel-like traffic delineators as are disclosed in the group of seventeen previously referenced patents) as may need to be received, stored and transported by the rack structures 171, 172, 173, respectively.

Although the invention has been described in a preferred form with particularity, it is understood that the present disclosure of the preferred form has been made only by way of example, and that numerous changes in the details of construction and the combination and arrangement of parts may be resorted to without departing from the spirit and scope of the invention.

What is claimed is:

1. An over-cab rack for supporting a plurality of substantially horizontally oriented nested stacks of barrel-like traffic delineators, with the rack comprising:
   a) a plurality of pairs of elongate, tubular rails, with each pair being formed from material suitable to support one of the pairs of horizontally oriented nested stacks of barrel-like traffic delineators;
   b) support structure connected to each of the rails of the pairs of elongate tubular rails to support the rails in a forward-rearward orientation that overlies a cab of a flat bed truck;
   c) a plurality of hoop structures each being sized to permit the relatively smaller forward end region of a different one of the barrel-like traffic delineators that forms the nested stacks to be inserted therethrough to support the relatively smaller forward end regions; and
   d) with each of the pairs of rails being substantially equally spaced apart to permit relatively larger rear end regions of the nested stacks of barrel-like delineators carried atop the pairs of rails to have the rear end regions of the nested stacks of barrel-like delineators supported by an associated pair of the rails.

2. The over-cab rack of claim 1 wherein each of the rails has front and rear end regions that are fastened to the support structure.

3. The over-cab rack of claim 2 wherein each of the hoop structures is slidably movable forwardly and rearwardly along an associated pair of rails for receiving a forward end region of an associated one of the horizontally oriented nested stack of barrel-like traffic delineators loaded atop the associated pairs of the rails.

4. The over-cab rack of claim 3 wherein each pair of rails is suitably spaced apart so as to underlie and provide support for rear end regions of each of the nested stack of barrel-like traffic delineators that is loaded atop the pair of rails to form a component of an associated one of the horizontally extending nested stacks of traffic delineators.

5. The over-cab rack of claim 4 wherein each of the annular hoop structures is provided with formations that overlie and underlie each of the associated pair of rails to prevent the hoop structures from raising above or lowering below the associated pair of rails as the hoop structures are moved along the associated pair of rails.

6. The over-cab storage rack of claim 5 additionally including a different elongate, flexible member connected to each of the annular hoop structures for applying force to the associated hoop structure for moving the associated hoop structure along the associated pair of rails.

7. The over-cab storage rack of claim 1 wherein a rearward end region of each of the pairs of rails extends into proximity with a forward end region of the flat bed of the truck to permit workers standing on the flat bed to readily insert one or more of the barrel-like traffic delineators atop a rearward end region of a selected one of the pairs of rails.

8. The over-cab rack of claim 1 wherein each of the pairs of rails is capable of independently supporting and permitting independent movement, in forward and rearward directions, of at least front portions of an associated one of the stacks of nested barrel-like traffic delineators.

9. The over-cab rack of claim 2 wherein:
   a) all of the rails have their forward end regions connected to a generally rectangular front structure of the support structure;
   b) all of the rails have their rearward end regions connected to a generally rectangular rear structure of the support structure, whereby the front and rear structures rigidly interconnect all of the elongate rails; and
   c) each of the pairs of rails is accompanied by a separate elongate member that is connected to each of the generally rectangular front and rear structures and is thereby supported to overlie an associated one of the nested stacks of barrel-like traffic delineators that extends along the associated pair of rails.

10. The over-cab rack of claim 1 wherein a rear region of the rack is configured to permit traffic delineators to be added to, and withdrawn from, the relatively larger end region of each of the nested stacks of traffic delineators.

11. The over-cab rack of claim 10 wherein each of the hoop structures of the plurality of hoop structures is located relatively forwardly with respect to the rear end region of the rack.

* * * * *